US008725871B2

(12) United States Patent
Ding et al.

(10) Patent No.: US 8,725,871 B2
(45) Date of Patent: May 13, 2014

(54) SYSTEMS AND METHODS FOR APPLICATION DEPENDENCY DISCOVERY (75) Inventors: Min Ding, Chalfont, PA (US); Vishal Singh, Princeton, NJ (US); Yueping Zhang, Princeton, NJ (US); Guofei Jiang, Princeton, NJ (US)

(73) Assignee: NEC Laboratories America, Inc., Princeton, NJ (US)

(*) Notice: Subject to any disclaimer, the term of this patent is extended or adjusted under 35 U.S.C. 154(b) by 185 days.

(21) Appl. No.: 13/284,350

(22) Filed: Oct. 28, 2011

(65) Prior Publication Data
US 2012/0191843 A1    Jul. 26, 2012

Related U.S. Application Data (60) Provisional application No. 61/436,252, filed on Jan. 26, 2011.

(51) Int. Cl.
*H04L 12/26* (2006.01)
*G06F 15/173* (2006.01)
*G06F 17/16* (2006.01)
*G06F 15/16* (2006.01)

(52) U.S. Cl.
USPC ............ 709/224; 709/223; 370/252; 370/254

(58) Field of Classification Search
USPC .......................... 709/223, 224; 370/252, 254
See application file for complete search history.

(56) References Cited

U.S. PATENT DOCUMENTS

| 7,953,011 | B1* | 5/2011 | Nucci et al. ............... 370/238 |
| 8,443,080 | B2* | 5/2013 | Ding et al. ............... 709/224 |
| 2002/0083065 | A1* | 6/2002 | Sasaki et al. ............... 707/100 |
| 2002/0161832 | A1* | 10/2002 | Brebner ............... 709/203 |
| 2009/0271509 | A1* | 10/2009 | Cao et al. ............... 709/224 |
| 2010/0097953 | A1* | 4/2010 | Charzinski et al. ............ 370/252 |
| 2010/0306290 | A1* | 12/2010 | Zhang et al. ............... 708/205 |
| 2011/0129222 | A1* | 6/2011 | Karol ............... 398/58 |
| 2011/0314441 | A1* | 12/2011 | Lee et al. ............... 717/105 |

OTHER PUBLICATIONS

Roy et al. (2005). "Studies in Network Partitioning Based on Topological Structure" Retrieved on Jun. 26, 2013. Retrieved from <http://www.eecs.wsu.edu/~sroy/Documents/rl00.pdf.*
Auger et al. (2005). "A Restart CMA Evolution Strategy with Increasing Population Size." Retrieved on Jun. 26, 2013. Retrieved from <https://www.lri.fr/~hansen/cec2005ipopcmaes.pdf>.*

(Continued)

*Primary Examiner* — Kamal Divecha
*Assistant Examiner* — Juan C Turriate Gastulo
(74) *Attorney, Agent, or Firm* — Joseph Kolodka (57) ABSTRACT

Systems and methods for discovering a set of applications that run on a network are disclosed. In accordance with one method, aggregate traffic volumes are determined for pairs of nodes on the network over a plurality of time intervals. The method further includes building a traffic matrix denoting each of the pairs of nodes and denoting respective aggregate traffic volume histories of each of the pairs of nodes that are based on the determined traffic volumes. In addition, the traffic matrix is formulated as a combination of bases vectors that model the set of applications. The bases vectors are determined by applying a covariance matrix adaptation evolutionary strategy based on the traffic matrix. An indication of the set of applications based on the bases vectors is output.

16 Claims, 4 Drawing Sheets

(56) References Cited

OTHER PUBLICATIONS

Bahl, P., et al. "Discovering Dependencies for Network Management" Workshop on Hot Topics in Networks (HotNets-V). Nov. 2006. pp. 1-6.

Barham, P., et al. "Using MAGPIE for Request Extraction and Workload Modeling" Proceedings of the Sith USENIX Symposium on Operating Systems and Implementation (OSDI) 2004. Dec. 2004. pp. 259-272.

Chen, X., et al. "Automating Network Application Dependency Discovery: Experiences Limitations, and New Solutions" 8th USENIZ Symposium on Operating Systems Design and Implementation. Dec. 2008. pp. 117-130.

Fonseca, R., et al. "X-Trace: A Pervasive Netowkr Tracing Framwork" 4th USENIX Symposium on Networked Systems Design & Implementation (NSDI '07). Apr. 2007. (14 Pages).

Hansen, N., et al. "A Method for Handling Uncertainty in Evolutionary Optimization with an Application to Feedback Control of Combustion" IEEE Transactions on Evolutionary Computation, vol. 13 Issue 1. Feb 2009. pp. 1-20.

Hansen, N., et al. "Completley Derandomized Self-Adaptation in Evolution Strategies" Evolutionary Computation archive, vol. 9 Issue 2. Jun. 2001. pp. 1-37.

Lee, D., et al. "Algorithms for Non-Negative Matrix Factorization" Neural Information Processing Systems—NIPS, vol. 13, 2000. pp. 556-562.

\* cited by examiner

SYSTEMS AND METHODS FOR APPLICATION DEPENDENCY DISCOVERY

RELATED APPLICATION INFORMATION

This application claims priority to provisional application Ser. No. 61/436,252 filed on Jan. 26, 2011, incorporated herein by reference.

This application is related to commonly owned U.S. patent application Ser. No. 13/100,805, entitled 'SYSTEM AND METHOD FOR DETERMINING APPLICATION DEPENDENCY PATHS IN A DATA CENTER'), which was filed on May 4, 2011 and is incorporated herein by reference.

BACKGROUND

1. Technical Field

The present invention relates to the discovery of application dependencies and, more particularly, to the discovery of network application dependencies.

2. Description of the Related Art

Current enterprise networks and modern data centers consist of mixtures of heterogeneous applications and services that are interleaved with each other in a complicated manner. Such applications and services include DNS (Domain Name System), active directory, email and authentication. Specifically, each service may support multiple applications and a particular application may rely on many different services. Moreover, each application itself usually has multiple components, some of which may be used by multiple applications. Understanding and identifying components and the interdependencies of each application is important for a wide spectrum of system management tasks, such as system monitoring, anomaly detection and diagnosis, system upgrading and patching, and application isolation and migration.

SUMMARY

One embodiment is directed to a method for discovering a set of applications that run on a network. In accordance with the method, aggregate traffic volumes are determined for pairs of nodes on the network over a plurality of time intervals. The method further includes building a traffic matrix denoting each of the pairs of nodes and denoting respective aggregate traffic volume histories of each of the pairs of nodes that are based on the determined traffic volumes. In addition, the traffic matrix is formulated as a combination of bases vectors that model the set of applications. The bases vectors are determined by applying a covariance matrix adaptation evolutionary strategy based on the traffic matrix. An indication of the set of applications based on the bases vectors is output.

An alternative embodiment is directed to a computer readable storage medium comprising a computer readable program. The computer readable program when executed on a computer causes the computer to perform the steps of the above-described method embodiment.

Another embodiment is directed to a system for discovering a set of applications that run on a network. The system includes a controller and at least one estimation module. The controller is configured to determine aggregate traffic volumes between pairs of nodes on the network over a plurality of time intervals. In addition, the controller is further configured to build a traffic matrix denoting each of the pairs of nodes and denoting respective aggregate traffic volume histories of each of the pairs of nodes that are based on the determined traffic volumes. Here, the traffic matrix is formulated as a combination of bases vectors that model the set of applications. The one or more estimation modules are configured to determine the bases vectors by applying a covariance matrix adaptation evolutionary strategy based on the traffic matrix. Moreover, the controller is further configured to output an indication of the set of applications that is based on the bases vectors.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Exemplary embodiments described herein apply a black box approach to discover applications running on a network and to identify dependencies between application components. In particular, embodiments can identify application dependency paths. An application dependency path is defined by distributed application components which constitute the application such that removing a component would result in failure of the application. The application dependency path is defined in terms of hosts/nodes of the network on which components are running, where these components participate in request processing. Each application component can be identified by IPaddress:port. In accordance with aspects of the present principles, application components and their dependencies can be discovered with no or minimal instrumentation in a black box fashion using network traffic monitoring features. Further, application dependency discovery and decomposition can be performed for multi-tiered and overlapping applications, where overlapping applications have one or more shared components.

A novel statistical analysis-based system that discovers application dependencies using global application traffic graphs over time is described. The technique employed is motivated by two intuitive observations. Firstly, the traffic at each application link can be viewed as the combination of traffic workloads caused by incoming application requests. Secondly, the message communication on dependent edges of a particular application exhibit stable concurrency in a small time window. In the exemplary system, a dynamic network traffic matrix can be constructed over time to represent the application connectivity graph over both spatial and temporal domains. In particular, the traffic matrix can be viewed as a fusion of vector bases that respectively model the applications and denote their components and their dependency links. Further, a covariance matrix adaptation evolutionary strategy (CMA-ES) can be utilized to factorize the connectivity graph into dependency subgraphs for different applications. By using CMA-ES as a robust feature extraction method, the latent traffic patterns can be revealed as dependency subgraphs via covariance-driven (re)sampling and evaluation. Further, domain knowledge based constraints can be explicitly applied in CMA-ES methods. The number of applications running on the network can be estimated from the global application traffic graph using singular-value decomposition (SVD) and power factorization with respect to complete and incomplete monitoring data respectively.

Certain techniques based on network traffic analysis rely on pairwise flow analysis with respect to one host and utilize co-occurrence and delay distribution of the flow pairs. However, they have several shortcomings. For example, pairwise techniques cannot be used for multi-hop (multi-tier) dependencies. As a result, they cannot be used to determine the number of applications running on the network and their application dependency paths. Furthermore, these techniques cannot recognize when a single application component is handling two different applications requests. In such a scenario, the accuracy of pair-wise analysis decreases. Moreover, such techniques analyze flow pairs in a given time interval. The size of this interval important, as it determines performance and accuracy. As such, the difficulty in the determination of the size of the time interval for these techniques leads to many false positives.

In contrast, the exemplary implementations of the present principles described herein address these shortcomings and can discover overlapping application as well as multi-tier application. While the pairwise flow analysis techniques are based on analysis of traffic flows on each host (local analysis), aspects of the present principles can be utilized to determine applications and their dependencies by observing the application traffic matrix globally, i.e. by employing a global view of data center traffic. One advantage provided by this feature is that each and every traffic flow need not be resolved on an independent basis. Rather, application and dependency discovery can be performed using aggregated traffic volumes. However, if traffic flow data is also available, the accuracy of the implementations increases.

It should be understood that embodiments described herein may be entirely hardware, entirely software or including both hardware and software elements. In a preferred embodiment, the present invention is implemented in hardware and software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Prior to discussing more specific details of exemplary embodiments, it should be noted that there are important aspects related to application dependency that should be considered. First, the application may depend on common data center services. These services are not specific to a particular application. DNS and storage service are examples of such services. Second, the application can consist of one or more components, where each component is miming on a different host on the network. The components of an application constitute the application dependency path. For example, a web server and a back-end database used by the web server can correspond to two such components. In accordance with aspects of the present principles, application dependency can be detected by determining the corresponding application dependency path. Application dependency can be detected in this way because, in a data center, for example, common services are relatively fixed and are well known to the administrator. Moreover, the operator can employ the application dependency path in order to perform root cause diagnosis, to make decisions about upgrades and patching and to perform other management tasks, as indicated above.

One difficulty associated with discovering application dependency is that applications can handle many different types of requests. An application dependency description can be formulated as all components on which the request processing of a particular application depends such that removing a component causes the application to fail. Consider a three-tier application: Web server, application server and database. The three-tier application has three kinds of application requests (workload): browse only, workload involving processing on the application server and workload involving database queries. While one objective is to discover the whole application path (3 hops), as, semantically, the three request types belong to one application, there are three applications from a traffic statistics point of view. Aspects of the application dependency discovery techniques described herein provide the dependency path, which includes the smaller dependency sub-paths. As noted above, an operator or user should know the largest complete path in order to perform network management tasks.

In the embodiments described herein below, passive traffic monitoring on network switches can be employed to discover applications and the dependencies of their components. There is no server-side overhead compared with instrumentation-based techniques. In addition, only part of a packet, for example, IP (Internet Protocol) and TCP (Transmission Control Protocol)/UDP (User Datagram Protocol) packet headers can be utilized, as embodiments need not rely on the content of the packets. As such, embodiments need not compile and employ semantic knowledge about application protocols.

Exemplary systems can observe the application traffic matrix globally and can decompose the application traffic graph into dependency subgraphs. This makes the application dependency discovery (ADD) especially effective in the presence of multi-hop and/or overlapping applications. Furthermore, dependency discovery can be performed using aggregated traffic volumes, as noted above. Moreover, the CMA-ES method employed naturally decomposes overlapped application events, which can be heavily interleaved in network traffic. The dependency pattern inference in accordance with CMA-ES benefits from both time correlation among consecutive services and spatial correlation on traffic workloads for the same application events. In addition, use CMA-ES facilitates the addition of a connectivity constraint to the objective function, as described in more detail herein below.

1. Overview

Figure 1:
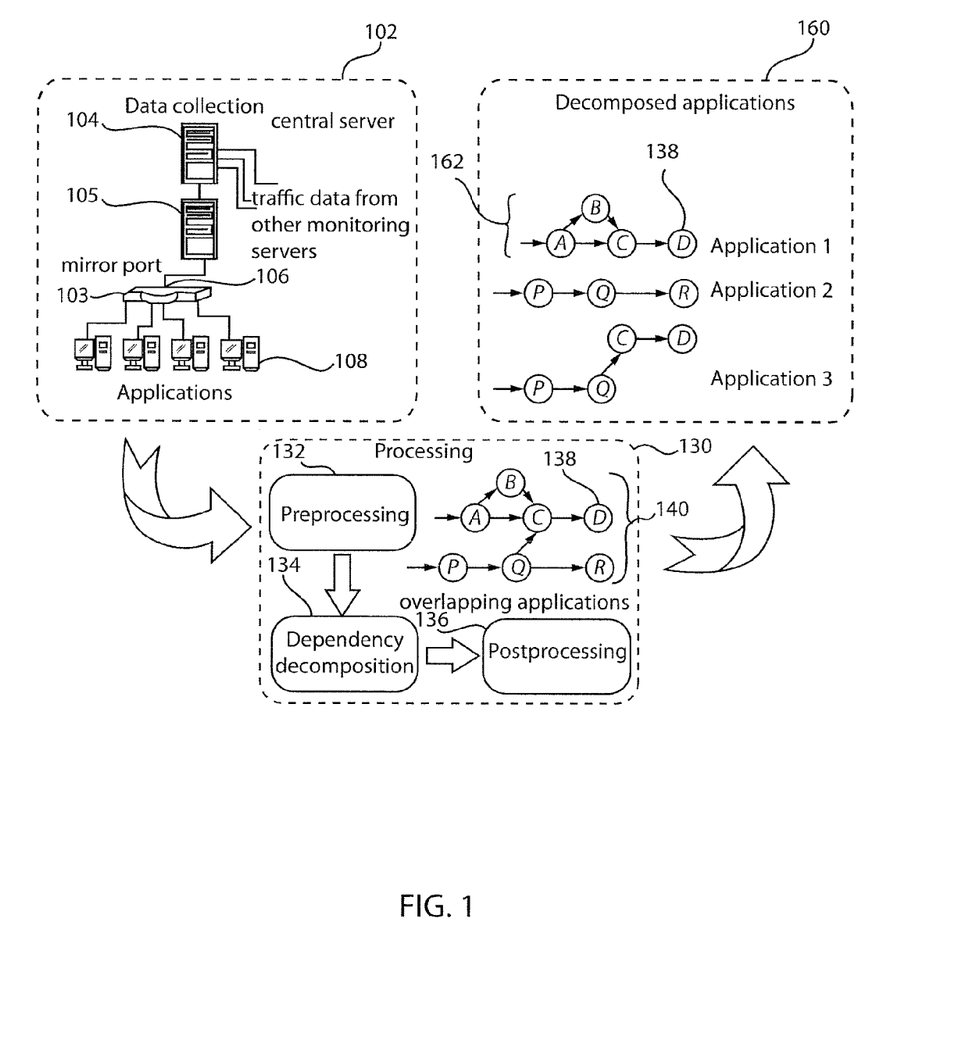
FIG. 1 is a high-level block/flow diagram of an exemplary architecture in which application and dependency discovery embodiments of the present principles can be implemented.

Preliminarily, an overview of exemplary application dependency discovery embodiments is provided. System and method embodiments can generate application-specific dependency graphs from network packet traces. One illustrative system architecture 100 is provided in FIG. 1. The architecture 100 includes a data collection block 102, a processing block 130 and an output block 160. As shown in FIG. 1, the data collection block 102 includes distributed network monitoring and centralized data processing elements. For example, network traffic generated by applications 108 is captured at each edge switch 103, which is directly connected to a dedicated monitoring server 105 via the switch's mirror port 106. Port mirroring was selected as a preferred capturing mechanism, as it provides efficient traffic capturing capabilities with minimal impact on traversing traffic. Periodically, each monitoring server 105 processes the collected data, calculates the traffic volume for each application layer link, and forwards the information to the central server 104, which performs the processing represented by block 130. In particular, the central server 104 performs the following three tasks sequentially: preprocessing 132, dependency decomposition 134 and post-processing 136.

In the preprocessing block 132, in response to receiving the data from all monitoring servers 105, the central server 104 sanitizes the data by removing management traffic, such as Simple Network Management Protocol (SNMP) traffic and Secure Shell (SSH) traffic, aligning measurement intervals on different switches and removing redundancy. For example, redundancy may arise when the same packet is captured twice if the system simultaneously monitors two switch ports where the packet traverses. After data sanitization, the central server 104 can continuously construct a dynamic global connectivity graph. This graph can be represented by a traffic matrix, $X_{n*m}$, in which each column records the traffic volumes between all $\langle IP:port \rangle$ pairs observed during the corresponding time interval and each row represents the history of traffic volume on the corresponding application link. Such a traffic matrix indicates the dynamic connectivity relationships of all application components over both the spatial and temporal domains.

In the dependency decomposition block 130, the central server 104 need not assume prior knowledge of the number of applications running in the system. The number of running applications is important system information, especially when system components are decomposed on a per-application basis. The system can determine the number of running applications by employing a singular value decomposition (SVD) based method. The estimated number of applications is further used in the dependency decomposition process 134, described in more detail herein below. Here, the dependency decomposition process 134 can determine a set of decomposed applications, represented by block 160, from a set of overlapping applications 140 described by the dynamic global connectivity graph (e.g., $X_{n*m}$). As stated above, each application can be modeled as an application dependency path, which can include nodes or hosts 138 that may be in a plurality of application dependency paths.

Application dependencies generated in the dependency decomposition block 130 may be affected by measurement noise and may contain false positives. Thus, postprocessing can be performed at block 136 to cross-validate the results and to reduce any inaccurate inferences. To accomplish this goal, the central server 104 can employ a mechanism that utilizes concurrent volume ratio (CVR) based correlation to locally identify correlated edges in dependency subgraphs. The post processing block 136 can also apply rules for fusion and pruning the dependency graphs. The rules can leverage domain knowledge of the operator as well as empirical observation of the traffic correlation scores.

2. Application Pattern Discovery by CMA-ES 2.1 Process

Let capitalized $X_{n*m}$ denote the traffic matrix after data collection and preprocessing described above, where each column consists of the traffic measurements of n observed pairs of hosts (or links) at a particular time interval and each row represents the measurement time series of each monitored host pair (link). In other words, each row designates a different pair of hosts from n observed pairs of hosts and is populated by a series of m measurements taken at different time intervals.

It should be noted that $x_{ij}$ is measured as the total traffic volume over some time interval $T_1$ of link i at time j. This is different from the general definition for traffic matrices (TMs), which is reported as the average of traffic volume over some time interval.

It should be further noted that the time interval between each measurement (i.e, the time interval between two columns of $X_{n*m}$) can be determined by domain knowledge and calibrated by evaluating against known bases of application patterns. If $T_1$ is too small, the signal strength on one application link may not be sufficient for detection purposes and thus may not distinguishable from the background noise. Conversely, with a time interval that is too long, two different applications may coincidentally be captured as corresponding to the same data samples with high frequency, thus causing irrelavent and confusing concurrency. In one exemplary embodiment, the time interval $T_1$ is set to 30 s.

The network traffic measurements at each time-stamp, i.e., each column of $X_{n*m}$, can be viewed as the combination of traffic workloads caused by multiple application events in a (non-negative) additive manner. It can be assumed that the events among different applications are independent and the network traffic exhibits the same dependency pattern corresponding to the same application, given the temporal span of observation matrix $X_{n*m}$. A specific application event can be represented by some correlated link volume variables and these variables may have linear relationships (e.g. linear invariant or constant). Thus, the observed traffic matrix can be considered to be a consequence of a linear or nonlinear fusion of a small number of hidden or latent m-dimensional variable bases for $X_{n*m}$. The application discovery is to extract such latent variable vector bases, each of which corresponds to a different underlying application and is often composed of only a few non-zero elements with significant values.

In accordance with one aspect of the present principles, application dependency discovery methods and systems can be implemented by applying, on $X_{n*m}$, a CMA-ES process for real-valued function searching. Given a non-negative n*m matrix X, the goal is find the non-negative n*r matrix W and non-negative n*r matrix H such that:

$$X_{n*m} \approx W_{n*r} \cdot H_{r*m}. \qquad (1)$$

Here, W represents the vector bases for $X_{n*m}$, while H represents the weight matrix for such bases. As described in more detail herein below, the vector bases denoted by W provide indications of application dependency paths.

The objective function is defined as follows $$\|X-WH\|^2 \quad (2)$$

where W is the multivariate random variable (r. v.) that is optimized by CMA-ES. The outline of CMA-ES algorithm is summarized in Table 1, below.

TABLE 1

Evolutionary Strategy with Covariance Matrix Adaptation Algorithm

Initialization
    Set evolution path $p_\sigma^{(0)} = 0 \cdot p_c^{(0)} = 0$;
    Set covariance matrix $C^{(0)} = I$;
    Set step size $\sigma^{(0)}$ and the distribution mean $m^{(0)}$.
For generation $g = 0, 1, 2, \ldots$ until stopping criterion met
    Sample new population of search points
        $x_k^{(g+1)} \sim \mathcal{N}(m^{(g)}, (\sigma^{(g)})^2 C^{(g)})$ for $k = 1, \ldots, \lambda$
    Selection and recombination $$m^{(g+1)} = \sum_{i=1}^{\mu} w_i x_{i:\lambda}^{(g+1)} \cdot \sum_{i=1}^{\mu} w_i = 1, w_i > 0$$

Step size control $$p_\sigma^{(g+1)} = (1-c_\sigma)p_\sigma^{(g)} + \sqrt{c_\sigma(2-c_\sigma)\mu_{\mathit{eff}}}\, C^{(g)-1/2} \frac{m^{(g+1)} - m^{(g)}}{\sigma^{(g)}}$$

$$\sigma^{(g+1)} = \sigma^{(g)} \exp\left\{\frac{c_\sigma}{d_\sigma}\left(\frac{\|p_\sigma^{(g+1)}\|}{E\|\mathcal{N}(0,I)\|}\right)\right\}$$

Covariance matrix adaption $$p_c^{(g+1)} = (1-c_c)p_c^{(g)} + h_\sigma^{(g+1)}\sqrt{c_c(2-c_c)\mu_{\mathit{eff}}}\, \frac{m^{(g+1)} - m^{(g)}}{\sigma^{(g)}}$$

$$C^{(g+1)} = (1-c_{cov})C^{(g)} + \frac{c_{cov}}{\mu_{cov}}\left(p_c^{(g+1)}(p_c^{(g+1)})^T\right) + c_{cov}\left(1-\frac{1}{\mu_{cov}}\right)\sum_{i=1}^{\mu} w_i \left(\frac{x_{i:\lambda}^{(g)} - m^{(g)}}{\sigma^{(g)}}\right)\left(\frac{x_{i:\lambda}^{(g)} - m^{(g)}}{\sigma^{(g)}}\right)^T$$

CMA follows the general stochastic optimization loop of iteratively sampling a r. v. according to its underlying distribution assumption, and computing the fitness of the sampled r. v. to determine whether to accept and weight it by evaluating the r. v. against the pre-defined objective function iteratively until the convergence criterion is reached. Particularly, CMA uses the multivariate Gaussian distribution assumption with a covariance matrix C to represent the shape of the mutation distribution (of the optimized random variable, which is W here). C is dynamically updated so that it can reliably adapt to an arbitrarily oriented scaling of the search space in small populations. Another uniqueness of CMA is the formation of a path of the time evolution for the learned distribution, termed an evolution path, which includes significant information about the correlation between consecutive steps in terms of the covariance matrix adaptation procedure and an additional process that controls the step size. The control of the step size is implemented to make the consecutive movement of the distribution mean orthogonal in expectation, which can effectively prevent premature convergence.

In accordance with one aspect of the present principles, W can be initialized by randomly selecting r columns of X and then concatenating the r columns to form W as a multivariate r. v. W' with n×r dimensions. r here represents the number of running applications and can be determined by employing a singular value decomposition process, as indicated above. The non-negativity of W' or W is guaranteed by setting its lower bound to zero during covariance matrix driven r.v. sampling. For numerical stability, the upper bound of W' or W is set as the maximum of $X_{n*m}$ per row (repeated by r times). The initial covariance is accordingly defined as a ratio of the standard deviation of $X_{n*m}$ per row. In one exemplary implementation, the ratio can be 0.05. The r. v. sampling and covariance matrix adaptation follows the CMA scheme outlined in Table 1. To weight each sampled r. v. of W, H is first calculated using the least-mean square error or pseudo-invariance of $$H=(W^TW)^{-1}W^TX \quad (3)$$

The non-negativity of H can be enforced by replacing its negative elements with zeros.

$$H_{i,j}=\max \geq \{0, H_{i,j}\};\, i=1,2\ldots r;\, j=1,2\ldots,m \quad (4)$$

Finally, by taking into account the domain knowledge that a valid latent pattern contains non-zero (positive) elements forming one single connected subgraph in each column of W, the original objective (equation 2) is modified as follows:

$$\|X-WH\|^2 + r' \times \delta \quad (5)$$

where r' is the number of columns in W that do not satisfy the above-described domain constraint, and δ is a constant discontinuity penalty, set as δ=n×m, which penalizes the discontinuity of W columns heavily. The subgraph connectivity determination is described in more detail in section 2.2 below.

By performing implicit matrix factorization via stochastic optimization in accordance with CMA-ES, r optimal bases or base components are learned from the high dimensional traffic data provided by $X_{n*m}$. Each observation of the network traffic at a particular time (column vector $x_t$) can be viewed as the weighted sum of these r base vectors ($w_1, \ldots, w_r$), where each base vector $w_i$ here is a column of W. Thus, it is logical to use the base vectors to reveal the latent application patterns hidden in the traffic data. In particular, an effective and practical method for estimating the number of the bases in a CMA-ES algorithm or any graph decomposition algorithm can be implemented by mapping it as rank estimation of $X_{n*m}$, which is then solved via spectral residue energy analysis using Singular Value Decomposition for complete data.

For example, singular vector decomposition (SVD) can be employed to find the optimal rank of the traffic matrix X by low rank estimation. The number of applications is estimated by solving the rank minimization problem (RMP) via an SVD solver. The RMP minimizes $\|X-\tilde{X}\|$, where $\tilde{X}=U\Sigma_{i=1}^{k}V^T$, U is an n×n unitary matrix (i.e., $U^TU=I$), V is an m×m unitary matrix (i.e., $V^TV=I$) and the matrix $\Sigma_{i=1}^{k}$ is an n×m diagonal matrix with the largest k singular values $\delta_i$ from $\Sigma$, which is an n×m diagonal matrix. The best rank r approximation of traffic matrix X is k if $\|X-\tilde{X}\|\leq\epsilon$, where $\epsilon$ is the tolerance for noise. One exemplary implementation of the rank estimation process is described in commonly owned, co-pending U.S. patent application Ser. No. 13/100,805, filed on May 4, 2011, which, as noted above, is incorporated herein by reference.

It should be noted that the scheme described above is a global-scaled graph decomposition method which can discover or extract the latent, statistical dependency traffic patterns as subgraphs, for possible semantic interpretation, via stochastic or non-stochastic (gradient based) optimization. Compared with other matrix factorization techniques, such as Principle Component Analysis and Independent Component Analysis, CMA-ES produces more semantically meaningful results given the type of traffic data collected here due to the enforced non-negative constraints. Furthermore, contrary to many methods that perform data analysis at each service node or each service link pair, the present scheme enables the capturing of high-order link dependencies from a more stable, efficient and robust top-down manner. Here, both spatial and temporal correlations are discovered seamlessly within the unified data representation and optimization framework through the holistic representation of the aggregated data matrix X over space and time. It should also be noted that it is not trivial to robustly chain pairwise link dependency pairs determined in accordance with pairwise methods into a higher order pattern (beyond pairwise) with high a accuracy and a low false alarm rate.

2.2 Subgraph Connectivity Determination

The number (r') of columns of the bases matrix W that have disconnected components should be calculated to properly weight the discontinuity penalty in (5) for each optimized intermediate result W. The connectivity of each column of $W_{n*r}$ (or, equivalently, W) can be tested by using the Laplacian matrix as a graph presentation and applying the rank constraint of the Laplacian matrix to calculate the number of connected components c for each column of W. A spatially connected column/basis has c=1.

The Laplacian matrix provides one means for presenting a graph through a matrix. Given a graph G(V, E) (where V denotes vertices and E denotes edges) with n vertices, its Laplacian matrix $L_{n*n}$ is defined as:

$$L_{uv} = \begin{cases} d_u & \text{if } u = v \\ -1 & \text{if } (u, v) \in E(G) \\ 0 & \text{otherwise} \end{cases} \quad (6)$$

where $d_u$ is the degree of vertex u. Given Lemma 1, below, and the fact that the rank of a square matrix is equal to the number of its non-zero eigenvalues, the number of connected components of graph G, c=n−rank(L), can be calculated as the number of zero eigenvalues of its Laplacian matrix L. In other words, rank(L)=n−1 for a valid fully connected graph. Thus, r' equals the number of columns of W with rank rank(L)<n−1.

Lemma 1. Let G be a graph with n vertices and c connected components. If L is the Laplacian of G, then rank rank(L)= n−c.

2.3 Exemplary Implementation of Application Pattern Discovery by CMA-ES

Figure 2:
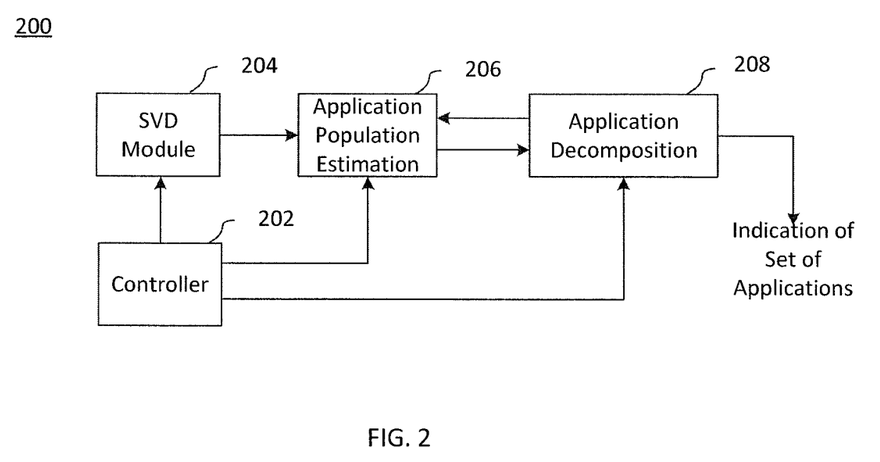
FIG. 2 is a high-level block/flow diagram of a system for discovering a set of applications running on a network in accordance with an exemplary embodiment.

Referring to FIG. 2, with continuing reference to FIG. 1, a high-level block/flow diagram of an exemplary system 200 for discovering applications and their respective distributed components in a network is illustrated. The system 200 can include an SVD module 204, an application population estimation (APE) module 206 and an application decomposition (AD) module 208. Each of the modules 204, 206 and 208 are types of estimation modules and can be combined into a single estimation module and/or with the controller 202. In the embodiment illustrated in FIG. 2, the operations of the SVD module 204, the APE 206 and the AD module 208 can be controlled by a controller 202. The elements 202-208 can be implemented in hardware by one or more hardware processors or can be implemented in both software and hardware elements, in which case one or more hardware processors can be configured to perform steps of software instructions. In one implementation, the system 200 can be implemented within the central server 104 described above. The details of the various elements of the system 200 are described herein below with respect to method embodiments.

Figure 3:
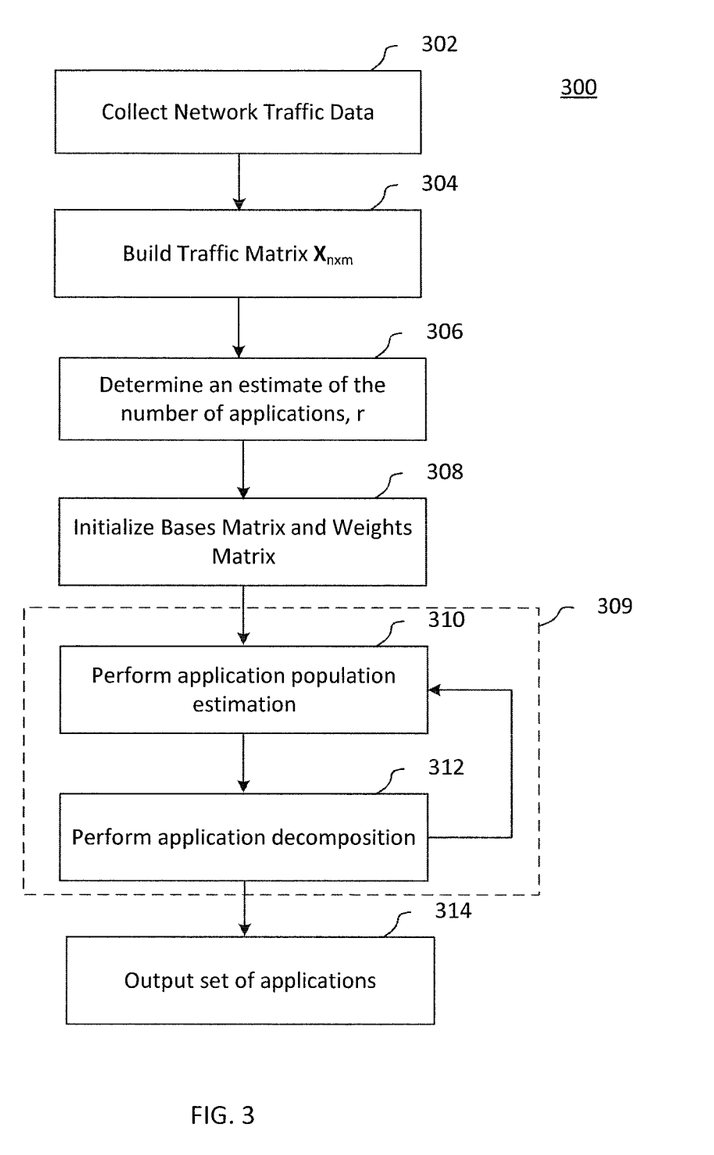
FIG. 3 is a high-level flow diagram of a method for discovering a set of applications running on a network in accordance with an exemplary embodiment.

Referring to FIG. 3, with continuing reference to FIGS. 1 and 2, a high-level flow diagram of a method 300 for discovering applications with components that are distributed in a network is illustrated. The method can begin at step 302, at which network data can be collected. For example, the monitoring servers 105 can collect traffic data from switches in the network through mirror ports 106. In particular, the monitoring servers 105 can log network traffic loads between pairs of monitored ports of nodes on the network over a plurality of time intervals. Further, the monitoring servers 105 can periodically transmit the logged network loads for various pairs of ports to the central server 104. As noted above, the central server 104 can include the controller 202, which can determine aggregate traffic volumes for pairs of nodes on the network over a plurality of time intervals based on the information obtained from the monitoring servers. Here, the aggregate traffic volume between nodes in a given pair of nodes constitutes all of the traffic volume between the nodes, which can include data for a plurality of different applications.

At step 304, the controller 202, which can be implemented at the central server 104, can build a traffic matrix based on the network traffic data collected at step 302. For example, the controller 202 can build the traffic matrix $X_{n*m}$, as described above. Here, each column of the traffic matrix records the traffic volumes between all ⟨IP:port⟩ pairs observed during a given time interval. In addition, each row represents the history of aggregate traffic volume over a plurality of time intervals on a corresponding application link between a given pair of ports of different nodes on the network. However, it should be understood that the method can be modified by one of ordinary skill in the art so that the rows of the traffic matrix records the traffic volumes between all pairs observed during a given time interval and so that the columns represent the history of aggregate traffic volume over a plurality of time intervals on corresponding application links. In this case, the method can be appropriately modified and performed in a manner similar to that described herein.

At step 306, the SVD module 204 can determine an estimate of the total number of applications running on the network. For example, the SVD module 204 can determine the number of running applications, r, by employing a singular value decomposition based method, as described above. The threshold for SVD based rank estimation can be chosen as 0.90, 0.95 to obtain a good numerical balance of the strength ratio between statistically significant signals and background noises, as singular values can be generally considered as energy spectrums in matrix analysis.

At step 308, the controller 202 can initialize a bases matrix and a weights matrix. As noted above, the traffic matrix $X_{n*m}$ can be interpreted as a fusion of latent bases, each of which model a specific application. The bases matrix can correspond to $W_{n*r}$ described above while the weights matrix can correspond to $H_{r*m}$ such that $X_{n*m} \approx W_{n*r} \cdot H_{r*m}$. As such, the bases matrix $W_{n*r}$ is composed of r columns, each modeling a separate application, and n rows, each denoting a separate link (i.e., pair of nodes). Thus, a significant non-zero value in position $W_{ij}$ indicates that the two nodes or components, i.e., one link denoted by i, are part of the application denoted by j. Accordingly, an accurately determined bases matrix $W_{n*r}$ would be an indication of the components (where a component is denoted by a port in one or more pairs of ports denoted by rows of $X_{n*m}$ and $W_{n*r}$) of each of the applications running on the network. Here, the bases matrix $W_{n*r}$ can be initiated by randomly selecting i columns of $X_{n*m}$ and concatenating the selected columns as a multivariate random variable, as described above. In addition, the weights matrix $H_{r*m}$ can be initialized by calculating $H=(W^TW)^{-1}W^TX$ and enforcing non-negativity by setting $H_{i,j}=\max\geq\{0,H_{i,j}\}$; i=1, 2 ... r; j=1, 2 ..., m, as described above.

At step 309, the AD module 208, in conjunction with the APE module 206, can determine the bases vectors by applying a CMA-ES process based on the traffic matrix. As described above, the CMA-ES process can be employed to optimize the bases matrix $W_{n*r}$, which in turn is composed of the various bases vectors that respectfully model the applications running on the network. For example, as noted above, $W_{n*r}$ can be formulated as r base vectors ($w_1, \ldots w_r$), where a given base vector $w_i$ is the $i^{th}$ column of $W_{n*r}$. The determination of the bases vectors at step 309 can be implemented iteratively by performing steps 310 and 312.

For example, the main loop of the CMA-ES process comprises three main parts: 1) sampling of new solutions; 2) re-ordering of the sampled solutions based on their fitness with regard to the objective function in equation (5); and 3) updating of the internal state variables based on the re-ordered samples. CMA-ES is a general purpose stochastic optimization method that optimizes a variety of multivariate objective or fitness functions. In accordance with aspects of the present principles, firstly, the basis matrix W can correspond to the multivariate random variable X in Table 1. In CMA-ES formulation, $\{X_k\}$ are represented as a set of random samples drawn from a multivariate Gaussian model in a given iteration of the process as indicated in sampling step in the generation loop of the algorithm of Table 1. Here, the samples in $\{X_k\}$ are preliminarily taken from an initial multivariate Gaussian model. Thereafter, $\{X_k\}$ is computed from an updated multivariate Gaussian model in one or more following iterations of the process. Secondly, using each $\{X_k\}$ as the W matrix, its counterpart $H_k$ is computed via a linear least square relation, as in equation (3), where X is the original data matrix. It should be noted that $X_k$ is used to compute W, while X is the original data matrix in equation (3). Given each pair of $\{X_k, H_k\}$, the sampled solutions are re-ordered and the fitness of each pair is evaluated according to equation (5). Small penalty values will result in lager $w_i$ and large penalty values will result in smaller $w_i$. Thirdly, $\{w_i$ and $X_i\}$ is used to update the mean and covariance estimate of the multivariate Gaussian model to obtain a new model. For example, the updating is represent by the remaining equations in Table 1, i.e., the equations for $m^{(g+1)}$, $\sigma^{(g+1)}$, $C^{(g+1)}$, etc. Given a new model, new samplings are drawn for $\{X_k\}$, as described above, for the next round of iterations of the process. The process can be repeated until converge is reached. An example of this process is implemented by steps 310 and 312. It should be noted that step 308 implements the initial sampling to obtain $\{X_k\}$ in the CMA-ES process described here.

At step 310, the APE module 206 of the system 200 can perform application population estimation. For example, referring to FIG. 4, with continuing reference to FIGS. 1-3, the APE module 206 can implement step 310 by performing an application population estimation method 400, depicted in FIG. 4. Here, the method 400 can begin at step 402, where the APE module 206 can receive an intermediate optimized matrix $W_{n*r}$. In the first iteration of the method 400, the matrix $W_{n*r}$ can be the initialized matrix $W_{n*r}$ determined at step 308.

Figure 4:
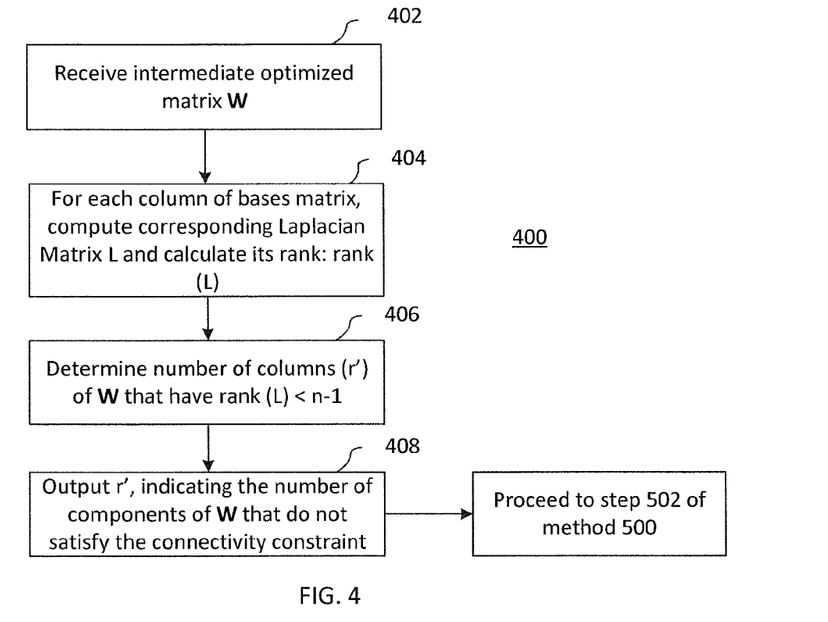
FIG. 4 is a high-level flow diagram of an application population method in accordance with an exemplary embodiment.

In accordance with the method 400, the module 206 can determine the number of bases vectors, r', that include disconnected components for a discontinuity penalty on each optimized intermediate result $W_{n*r}$. As noted above, the connectivity of each column of $W_{n*r}$ (or, equivalently, W) can be tested by using the Laplacian matrix as a graph presentation and applying the rank constraint of the Laplacian matrix to calculate the number of connected components for each column of $W_{n*r}$, and thereby obtain r'. Thus, at step 404, for each column of the bases matrix $W_{n*r}$, the APE module 206 can compute the corresponding Laplacian Matrix $L_{n*r}$, thereby obtaining a connectivity graph for the column, and can calculate its rank: rank($L_{n*n}$), as described above. Further, at step 406, the APE module 206 can determine the total number of columns of W that have a rank(L) that is less than n−1 and can set this total number as r'. In other words, any column of W that has a corresponding Laplacian matrix with a rank that is less than n−1 is accounted for in r' and r' is set as a sum of these columns. At step 408, the APE module 206 can output r' to the AD module 208. Here, r' provides an indication of the number of columns of W that do not satisfy the connectivity constraint. In other words, r' denotes the number of bases vectors that include disconnected components. As noted above, a valid latent pattern contains non-zero positive elements that form one single connected subgraph in a column of W. Thus, any column of W that has more than one connected subgraph does not satisfy the connectivity constraint. For example, assume a column of W indicates that only two links are formed, with node 1/node 2 forming the first link and node 3/node 4 forming the second link. Because two subgraphs are formed, i.e. the subgraph of the first link is not connected to the subgraph of the second link, this column does not satisfy the connectivity constraint. After outputting r', the process can proceed to step 502 of the method 500, described herein below.

Figure 5:
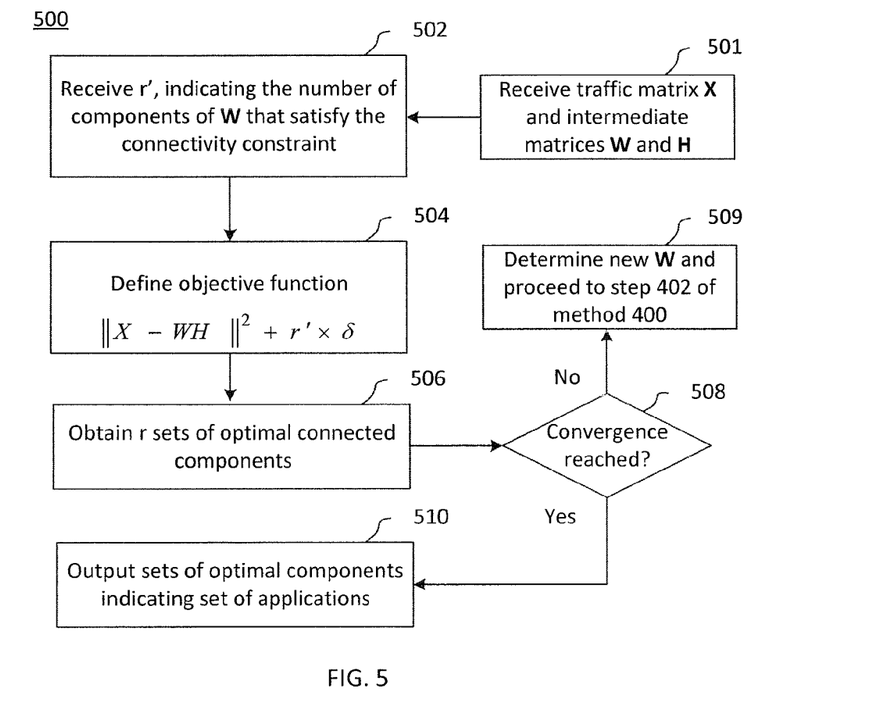
FIG. 5 is a high-level flow diagram of an application decomposition method in accordance with an exemplary embodiment.

Returning to the flowchart of FIG. 3, the method 300 can proceed to step 312, at which the AD module 208 can perform application decomposition. For example, with reference to FIG. 5, with continuing reference to FIGS. 1-4, in accordance with one embodiment, the AD module 208 can implement step 312 by performing the application decomposition method 500 illustrated in FIG. 5. The method 500 can begin at step 501, at which the AD module 208 can receive the traffic matrix $X_{n*m}$ and the intermediate matrices W and H determined at step 308 from the controller 202. Alternatively, the AD module 208 can compute H directly from the matrix W received from the controller 202. At step 502, the AD module 208 can receive r', which is output from the APE module 206 at step 408. At step 504, the AD module 208 can define the objective function, as described above with respect to (5), using r' obtained at the most recent iteration of step 502 as follows: $\|X-WH\|^2+r'\times\delta$. In particular, r' can be used to weigh the constant discontinuity penalty δ. As noted above, the discontinuity penalty penalizes the discontinuity of W columns heavily and can be set as $\delta=n\times m$. In one exemplary implementation, δ can be set to 5000. The AD module 208 can be configured to optimize W such that the objective function is minimized. Thus, at step 506, the AD module 208 can use the traffic matrix and the objective function to obtain an optimized value of the bases matrix W. As indicated above, the lower bound of W can be set to zero during covariance matrix driven random variable sampling. Further, to ensure numerical stability, the upper bound W can be set as the maximum of $X_{n*m}$ per row, repeated by r times. Moreover, the initial covariance can be set as a ratio (e.g., 0.05) of the standard deviation of $X_{n*m}$ per row. Here, the optimized W provides r sets of optimal connected components. As indicated above, each column of W denotes a set of paired components. For example, for column j denoting one of the applications, $W_{ij}$ indicates that the two components denoted by i are part of the application denoted by j if the value at $W_{ij}$ is a significant non-zero value. To obtain the r sets of optimally connected components, in one example, all $W_{ij}$ in column j can be first sorted in descending order. Then the subset $\{W_{ij}\}$ is chosen such that it consists of non-zeros in order until the ratio of their sum over the total sum of all $W_{ij}$ in column j is larger than the threshold 0.9; the remaining $W_{ij}$ elements are set as zeros. This feature corresponds to the re-ordering described above with regard to the CMA-ES process. In addition, the multivariate Gaussian models are updated as described above. Thereafter, at step 508, the AD module 208 can determine whether convergence has been reached. For example, the convergence criteria can be a maximum number of iterations of the method 500 and/or a threshold value α for the objective function $\|X-WH\|^2+r'\times\delta$. For example, the AD module 208 can deem that convergence has been reached if a maximum number of iterations has been reached and/or $\|X-WH\|^2+r'\times\delta\leq\alpha$. If convergence has not been reached, then the AD module 208 can, at step 509, perform random sampling, as described above with respect to step 308, of the bases matrix W determined at the most recent iteration of step 506 to obtain a new set $\{X_k\}$ as the W matrix. The AD module 208 can provide this new W matrix to the APE module 206, and the process can proceed to step 402 of the method 400. Here, the APE module 206 can perform the method 400 using the bases matrix W determined at the most recent iteration of step 509. Thereafter, steps 502-506 can be repeated using the value of r' determined in accordance with the most recent iteration of the method 400. If convergence has been reached, then the method can proceed to step 512, at which the AD module 208 can output to the controller 202 the most recently determined W as the sets of optimal components, which indicate the set of applications running on the network.

Returning to the flowchart in FIG. 3, the controller 202 can, at step 314, output an indication of the determined set of running applications to the user. In particular, the controller 202 can output, for each of the applications, an indication of which of the nodes accounted for in W compose the application and of the links between the nodes that compose the application. For example, based on W, the controller 202 can construct a dependency graph for each application and can output the dependency graphs to the user. Each dependency graph can be composed of a group of service nodes and can illustrate the communication links between them.

It should be noted that the controller 202 can implement the preprocessing block 132 before the performance of the method 300 and can implement the postprocessing block 136 before step 314 is performed. For example, the controller 202 can sanitize the traffic data at block 132 by removing management traffic, removing redundancy, etc., as described above. In addition, the controller 202 can utilize CVR based correlation techniques to identify correlated edges in dependency subgraphs and can apply rules for fusing and pruning the graphs. An example of a CVR correlation technique is described in commonly owned, co-pending U.S. patent application Ser. No. 13/100,805, filed on May 4, 2011, which, as noted above, is incorporated herein by reference.

Having described preferred embodiments of a systems and methods for application dependency discovery (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for discovering a set of applications that run on a network, the method comprising:
    determining aggregate traffic volumes for pairs of nodes on the network over a plurality of time intervals;
    building a traffic matrix denoting each of the pairs of nodes and denoting respective aggregate traffic volume histories of each of the pairs of nodes that are based on the determined traffic volumes, wherein the traffic matrix is formulated as a combination of bases vectors that model the set of applications;
    determining, by a processor, the bases vectors by applying a covariance matrix adaptation evolutionary strategy (CMA-ES) based on the traffic matrix; and
    outputting an indication of the set of applications that is based on the bases vectors, wherein the determining the bases vectors further comprises determining a number of the bases vectors that include disconnected components, and
    wherein the determining the bases vectors further comprises imposing a discontinuity penalty in an objective function optimized by the CMA-ES and weighting the discontinuity penalty with the number of the bases vectors that include disconnected components.

2. The method of claim 1, wherein the determining the number of the bases vectors that include disconnected components further comprises determining a connectivity graph for each of the bases vectors.

3. The method of claim 2, wherein the determining the connectivity graph for each of the bases vectors further comprises computing a Laplacian matrix for each of the bases vectors and wherein the number of the bases vectors that include disconnected components is computed as a sum of the bases vectors that have a respective Laplacian matrix with a rank that is less than the size of the respective bases vector minus one.

4. The method of claim 1, wherein the outputting further comprises outputting, for each of the applications, an indication of which of the nodes in the pairs of nodes compose the application.

5. The method of claim 4, wherein the outputting further comprises outputting, for each of the applications, an indication of links between the nodes that compose the application.

6. The method of claim 1, further comprising determining a total number of applications (r) in the set of applications, wherein the determining the bases vectors is based on the determined total number of applications in the set of applications.

7. The method of claim 6, wherein the bases vectors are formulated as a bases matrix and wherein the method further comprises initializing the bases matrix by selecting r columns or rows of the traffic matrix and concatenating the columns or rows as a multivariate random variable for the CMA-ES.

8. A non-transitory computer readable storage medium comprising a computer readable program, wherein the computer readable program when executed on a computer causes the computer to:
   determine aggregate traffic volumes between pairs of nodes on a network over a plurality of time intervals;
   build a traffic matrix denoting each of the pairs of nodes and denoting respective aggregate traffic volume histories of each of the pairs of nodes that are based on the determined traffic volumes, wherein the traffic matrix is formulated as a combination of bases vectors that model the set of applications;
   determine the bases vectors by applying a covariance matrix adaptation evolutionary strategy (CMA-ES) based on the traffic matrix; and
   output an indication of a set of applications that run on the network that is based on the bases vectors,
   wherein the determining the bases vectors further comprises determining a number of the bases vectors that include disconnected components, and
   wherein the determining the bases vectors further comprises imposing a discontinuity penalty in an objective function optimized by the CMA-ES and weighting the discontinuity penalty with the number of the bases vectors that include disconnected components.

9. The non-transitory computer readable storage medium of claim 8, wherein the computer readable program when executed on a computer causes the computer to output, for each of the applications, an indication of which of the nodes in the pairs of nodes compose the application.

10. A system for discovering a set of applications that run on a network comprising:
    a controller, implemented by a processor, configured to determine aggregate traffic volumes between pairs of nodes on the network over a plurality of time intervals and to build a traffic matrix denoting each of the pairs of nodes and denoting respective aggregate traffic volume histories of each of the pairs of nodes that are based on the determined traffic volumes, wherein the traffic matrix is formulated as a combination of bases vectors that model the set of applications; and
    at least one estimation module configured to determine the bases vectors by applying a covariance matrix adaptation evolutionary strategy (CMA-ES) based on the traffic matrix,
    wherein the controller is further configured to output an indication of the set of applications that is based on the bases vectors,
    wherein the at least one estimation module further includes an application population estimation module that is configured to determine a number of the bases vectors that include disconnected components, and
    wherein the at least one estimation module further includes an application decomposition module that is configured to impose a discontinuity penalty in an objective function optimized by the CMA-ES and weight the discontinuity penalty with the number of the bases vectors that include disconnected components.

11. The system of claim 10, wherein the application population estimation module is configured to determine the number of the bases vectors that include disconnected components by determining a connectivity graph for each of the bases vectors.

12. The system of claim 11, wherein the application population estimation module is configured to determine the connectivity graph for each of the bases vectors by computing a Laplacian matrix for each of the bases vectors and to compute the number of the bases vectors that include disconnected components as a sum of the bases vectors that have a respective Laplacian matrix with a rank that is less than the size of the respective bases vector minus one.

13. The system of claim 10, wherein the controller is further configured to output, for each of the applications, an indication of which of the nodes in the pairs of nodes compose the application.

14. The system of claim 13, wherein the controller is further configured to output, for each of the applications, an indication of links between the nodes that compose the application.

15. The system of claim 10, wherein the at least one estimation module includes a first module that is configured to determine a total number of applications (r) in the set of applications and wherein the at least one estimation module further comprises a second module that is configured to determine the bases vectors based on the determined total number of applications in the set of applications.

16. The system of claim 15, wherein the second module is further configured to formulate the bases vectors as a bases matrix and wherein the controller is further configured to initialize the bases matrix by selecting r columns or rows of the traffic matrix and concatenating the columns or rows as a multivariate random variable for the CMA-ES.

* * * * *